United States Patent [19]

Divecha et al.

[11] Patent Number: 4,958,763

[45] Date of Patent: Sep. 25, 1990

[54] METHOD OF SOLDERING ALUMINUM

[75] Inventors: Amarnath P. Divecha, Falls Church; William A. Ferrando, Arlington, both of Va.; Philip W. Hesse, Ellicott City, Md.; Subhash D. Karmarkar, Great Falls, Va.

[73] Assignee: The United States of America as represented by the Secretary of the Navy, Washington, D.C.

[21] Appl. No.: 401,197

[22] Filed: Aug. 29, 1989

[51] Int. Cl.$^5$ .................... B23K 1/20; B23K 103/10
[52] U.S. Cl. .................................. 228/193; 228/208; 228/254; 228/263.17
[58] Field of Search ............... 228/175, 193, 183, 254, 228/208, 209, 263.17; 427/125, 328, 419.8

[56] References Cited

U.S. PATENT DOCUMENTS

| | | | |
|---|---|---|---|
| 1,904,241 | 4/1933 | Kammerer | 228/193 |
| 3,096,577 | 7/1963 | Carlson et al. | 228/254 |
| 3,482,305 | 12/1969 | Dockus et al. | 228/208 |
| 3,949,122 | 4/1976 | Lepetit et al. | 228/209 |
| 4,426,404 | 1/1984 | Shoher et al. | 228/209 |
| 4,650,108 | 3/1987 | Gallagher | 228/124 |

FOREIGN PATENT DOCUMENTS

| | | | |
|---|---|---|---|
| 144148 | 6/1948 | Australia | 228/209 |
| 6153 | 1/1976 | Japan | 228/209 |

OTHER PUBLICATIONS

Metals Handbook Ninth Edition, vol. 5, pp. 604–606, copyright 1982.

*Primary Examiner*—Sam Heinrich
*Attorney, Agent, or Firm*—Kenneth E. Walden; Roger D. Johnson

[57] ABSTRACT

An aluminum or aluminum alloy surface is coated with molten $AgNO_3$, the silver nitrate is decomposed (at about 450° C.–550° C.) leaving a thin layer of silver metal, and then an inter-diffusion layer of silver and aluminum is formed (at about 570° C.–660° C.). The treated surface can be soldered by conventional means.

13 Claims, No Drawings

4,958,763

METHOD OF SOLDERING ALUMINUM

BACKGROUND OF THE INVENTION

This invention relates to methods of joining metal parts and more particularly to methods of soldering aluminum.

In aluminum soldering, the primary difficulty is associated with the stability of aluminum oxide film which is practically impossible to avoid. Soldering of aluminum and its alloys is generally avoided because of this reason. Solder joints are not very easy to achieve and joint strengths are usually low and unreliable.

SUMMARY OF THE INVENTION

Accordingly an object of this invention is to provide a new method of soldering aluminum and its alloys.

Another object of this invention is to provide treated aluminum surfaces which can easily be soldered.

These and other objects of this invention are accomplished by providing a process comprising:

(1) wetting an aluminum or aluminum alloy surface with molten $AgNO_3$;

(2) heating the $AgNO_3$ coated aluminum surface at a temperature of from the decomposition temperature of $AgNO_3$ to about 550° C. to decompose the $AgNO_3$ and form a Ag metal film; and (3) heating the surface from the decomposition temperature of from about 570° C. to just less than the melting point of aluminum to produce an inter-diffusion layer of silver and aluminum.

The treated aluminum surface can be soldered by normal means.

DETAILED DESCRIPTION OF THE PREFERRED EMBODIMENT

Molten $AgNO_3$ (MP 212° C.) is coated on to the aluminum or aluminum alloy surface which is to be soldered. The molten $AgNO_3$ is applied at a temperature above the melting point of $AgNO_3$ but below the decomposition temperature of $AgNO_3$. The surface is heated to keep the $AgNO_3$ molten after it is applied. The molten $AgNO_3$ wets and spreads out evenly over the aluminum surface.

Next, the aluminum surface and $AgNO_3$ coating are heated at a temperature of from the decomposition temperature of $AgNO_3$ to about 550° C., preferably from 450° C. to 550° C., and more preferably from 450° C. to 500° C., until the $AgNO_3$ (d. 444° C.) decomposes to form a thin uniform film of silver metal.

The silver metal coated aluminum or aluminum alloy surface is then heated at a temperature above the Ag-Al eutectic temperature but below the melting point of aluminum until the silver metal forms an inter-diffusion layer with the aluminum. More specifically, the silver metal coated aluminum or aluminum alloy surface is heated at a temperature of from about 570° to just below the melting point of aluminum, preferably from 570° C. to 650° C., and more preferably from 570° C. to 600° C. until the silver-aluminum inter-diffusion layer is formed. Note the aluminum and silver do not form any brittle intermetallic compounds. The nature of the inter-diffusion layer is that of an alloy. The process replaces the normal aluminum oxide surface coating of aluminum or aluminum alloys with a silver-aluminum inter-diffusion layer. This silver-aluminum inter-diffusion layer prevents the reformation of an aluminum oxide coating. As a result, the soldering can be done at a later date. Conventional solder joints are made at the silver-aluminum diffusion layer surface. Typical solders such as cadmium solder, unfluxed lead-tin solder, zinc based solder, etc., may be used.

The general nature of the invention having been set forth, the following examples are presented as specific illustrations thereof It will be understood that the invention is not limited to these specific examples but is susceptible to various modifications that will be recognized by one of ordinary skill in the art.

EXAMPLE 1

About 3 grams of $AgNO_3$ was placed on a sheet of aluminum foil and then heated until the $AgNO_3$ melted and spread uniformly over the aluminum foil surface. The coated sheet was then heated at 460° C. until the $AgNO_3$ decomposed to form a thin layer of silver metal. The silver appeared to wet the aluminum, readily forming a tightly bonded film.

EXAMPLE 2

A silver coated aluminum foil sheet was prepared according to the method of Example 1. Hansen, M., *Constitution of Binary Alloys*, 2nd ed., (1958) McGraw-Hill Co., New York, in FIG. 1 on page 2, shows that a silver-aluminum eutectic is present at 566° C. It is further stated that the near identity of atomic radii sizes for the two elements contributes to the observation of extensive solid solubility of Ag in Al. The sample, therefore, was heated in air to ~785° C., which is well above both this eutectic point and the melting temperature of pure aluminum (660° C.). No curling, separating or beading of the aluminum foil was observed after 6 hours exposure to this temperature. This indicated formation of an interdiffusion layer of aluminum into silver and silver into aluminum which bonded the aluminum foil to the silver coating.

EXAMPLE 3

A silver coated aluminum sheet prepared according to Example 1 and additionally heated for ½ hour to the eutectic point (~570° C.). A tinned copper wire was soldered subsequently to the silver layer on the aluminum foil using only cadmium solder. Although the bond strength has not yet been measured, the joint appears to be sound. In one instance, pulling off the wire removed a small portion of the aluminum foil with the wire.

Obviously, numerous modifications and variations of the present invention are possible in light of the above teachings. It is therefore to be understood that within the scope of the appended claims the invention may be practiced otherwise than as specifically described herein.

What is claimed is:

1. A process for preparing aluminum materials for soldering which comprises the following steps in order:
   (1) coating the surface of an aluminum material selected from the group consisting of aluminum and aluminum alloys with molten $AgNO_3$ at a temperature above the melting point of $AgNO_3$ but below the decomposition temperature of $AgNO_3$;
   (2) heating the $AgNO_3$ and aluminum material at a temperature of from the decomposition temperature of $AgNO_3$ to about 550° C. to decompose the $AgNO_3$ and form a thin layer of silver metal on the surface of the aluminum material; and (3) further heating the silver coated aluminum material at a temperature of from about 570° C. to just less than the melting point of aluminum to produce an inter-diffusion layer of silver and aluminum.

2. The process of claim 1 wherein the aluminum material is aluminum.

3. The process of claim 1 wherein the AgNO$_3$ decomposition step (2) is performed at a temperature of from 450° C. to 550° C.

4. The process of claim 3 wherein the AgNO$_3$ decomposition step (2) is performed at a temperature of from 450° C. to 500° C.

5. The process of claim 1 wherein the inter-diffusion step (3) is performed at a temperature of from about 570° C. to 650° C.

6. The process of claim 5 wherein the inter-diffusion step (3) is performed at a temperature of from 570° C. to 600° C.

7. A process for soldering aluminum materials which comprises the following steps in order:
   (1) coating the surface of an aluminum material selected from the group consisting of aluminum and aluminum alloys with molten AgNO$_3$ at a temperature above the melting point of AgNO$_3$ but below the decomposition temperature of AgNO$_3$;
   (2) heating the AgNO$_3$ and aluminum material at a temperature of from the decomposition temperature of AgNO$_3$ to about 550° C. to decompose the AgNO$_3$ and form a thin layer of silver metal on the surface of the aluminum material;
   (3) heating the silver coated aluminum material at a temperature of from about 570° C. to just less than the melting point of aluminum to produce an inter-diffusion layer of silver and aluminum; and
   (4) forming a solder connection at a point on the silver-aluminum inter-diffusions layer.

8. The process of claim 7 wherein after step (3) but before step (4) the silver-aluminum inter-diffusion layer and aluminum material are cooled to room temperature.

9. The process of claim 7 wherein the aluminum material is aluminum.

10. The process of claim 7 wherein the AgNO$_3$ decomposition step (2) is performed at a temperature of from 450° C. to 550° C.

11. The process of claim 10 wherein the AgNO$_3$ decomposition step (2) is performed at a temperature of from 450° C. to 500° C.

12. The process of claim 7 wherein the inter-diffusion step (3) is performed at a temperature of from about 570° C. to 650° C.

13. The process of claim 12 wherein the inter-diffusion step (3) is performed at a temperature of from about 570° C. to 600° C.

* * * * *